Figure 1:
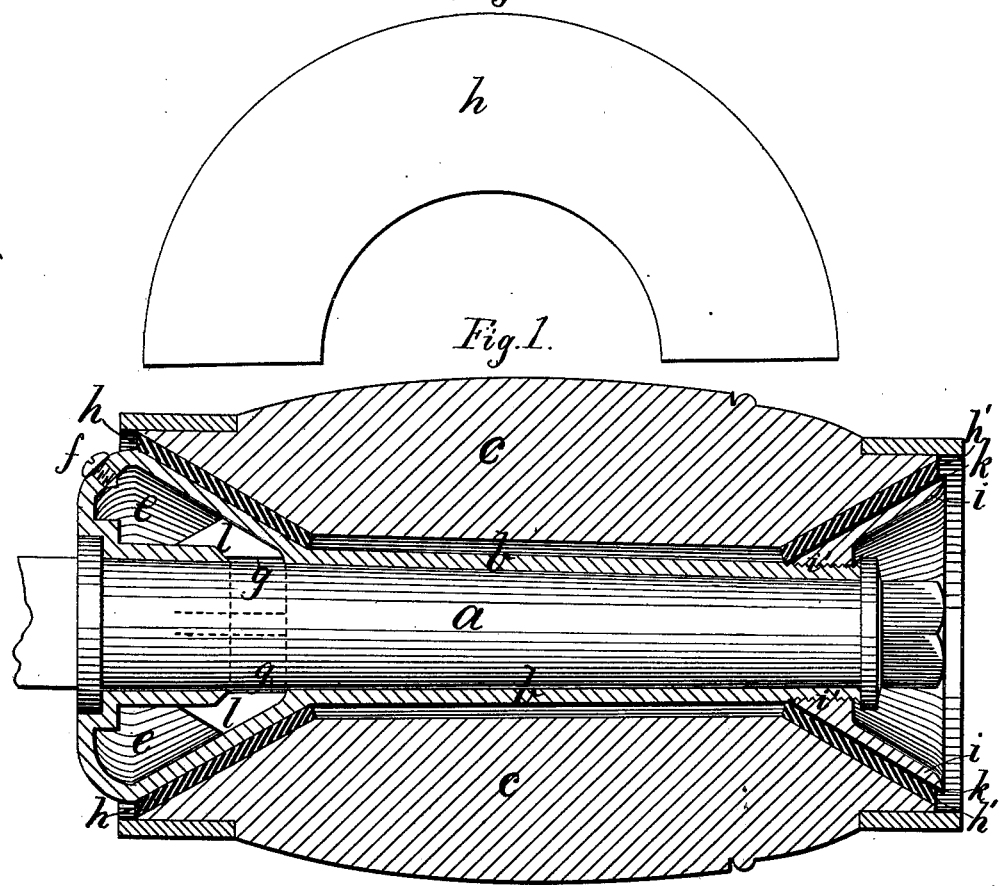

2 Sheets—Sheet 1.

J. EDSON.
Vehicle Axle-Box.

No. 200,903. Patented March 5, 1878.

WITNESSES:
Henry Chadbourn.
F. Allen.

INVENTOR:
Jacob Edson
by Albert Andrew
his atty.

N. PETERS, PHOTO-LITHOGRAPHER, WASHINGTON, D C

2 Sheets—Sheet 2.

J. EDSON.
Vehicle Axle-Box.

No. 200,903. Patented March 5, 1878.

WITNESSES:
Henry Chadbourn.
F. Allen.

INVENTOR:
Jacob Edson
by Alban Andren
his atty.

N. PETERS, PHOTO-LITHOGRAPHER, WASHINGTON, D. C.

UNITED STATES PATENT OFFICE.

JACOB EDSON, OF BOSTON, MASSACHUSETTS.

IMPROVEMENT IN VEHICLE-AXLE BOXES.

Specification forming part of Letters Patent No. 200,903, dated March 5, 1878; application filed December 26, 1877.

*To all whom it may concern:*

Be it known that I, JACOB EDSON, of Boston, in the county of Suffolk and State of Massachusetts, have invented certain new and useful Improvements in Elastic Wheels; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in elastic wheels, and it is carried out in the following manner: Through the hub of the wheel is inserted a sleeve that serves as a bearing for the shaft or axle, which sleeve is provided in one end with a conical chamber for holding the lubricant, which is put into said chamber through an exterior opening, that is closed when the wheel is in use by means of a set-screw or equivalent device, and through the part of such chamber that surrounds the axle are made perforations, through which the lubricating material is evenly distributed on the shaft or axle in its bearing. Around the said conical chamber is laid an elastic cone-shaped packing that rests in a conical recess made in the end of the hub. The opposite or outer end of the hub is also provided with a conical recess, in which rests another cone-shaped elastic packing, that is held in its place by means of a conical nut provided with an interior screw-thread through its central part, which screw-threaded portion fits over and surrounds the screw-threaded end of the sleeve or bearing for the shaft or axle. By means of said conical nut the aforesaid cone-shaped elastic packings are compressed sufficiently without destroying the elasticity of such packings, and in this manner the hub is made yielding on its sleeve or bearing both laterally in the direction of the axle and in the direction of the spokes, and by means of these elastic cone-shaped packings large and durable easements are furnished for the wheel, and at the same time, as they are strong, simple, and effective, they do not weaken or disfigure the hub of the wheel, and they prevent all unnecessary jar, strain, and noise.

An additional packing of cylindrical form may be added between the bearing-sleeve and the interior of the hub; but this is not an important feature of my invention.

This my invention is equally useful for wood, iron, composition, or other metallic hubs. The conical chamber is strengthened, by means of feathered ribs in the interior thereof, at its junction with the central sleeve or bearing, where great strength, as well as lightness, is required. The said elastic cone-shaped packings may be molded seamless, or may be cut out from flat sheets without departing from my invention.

Figure 2:
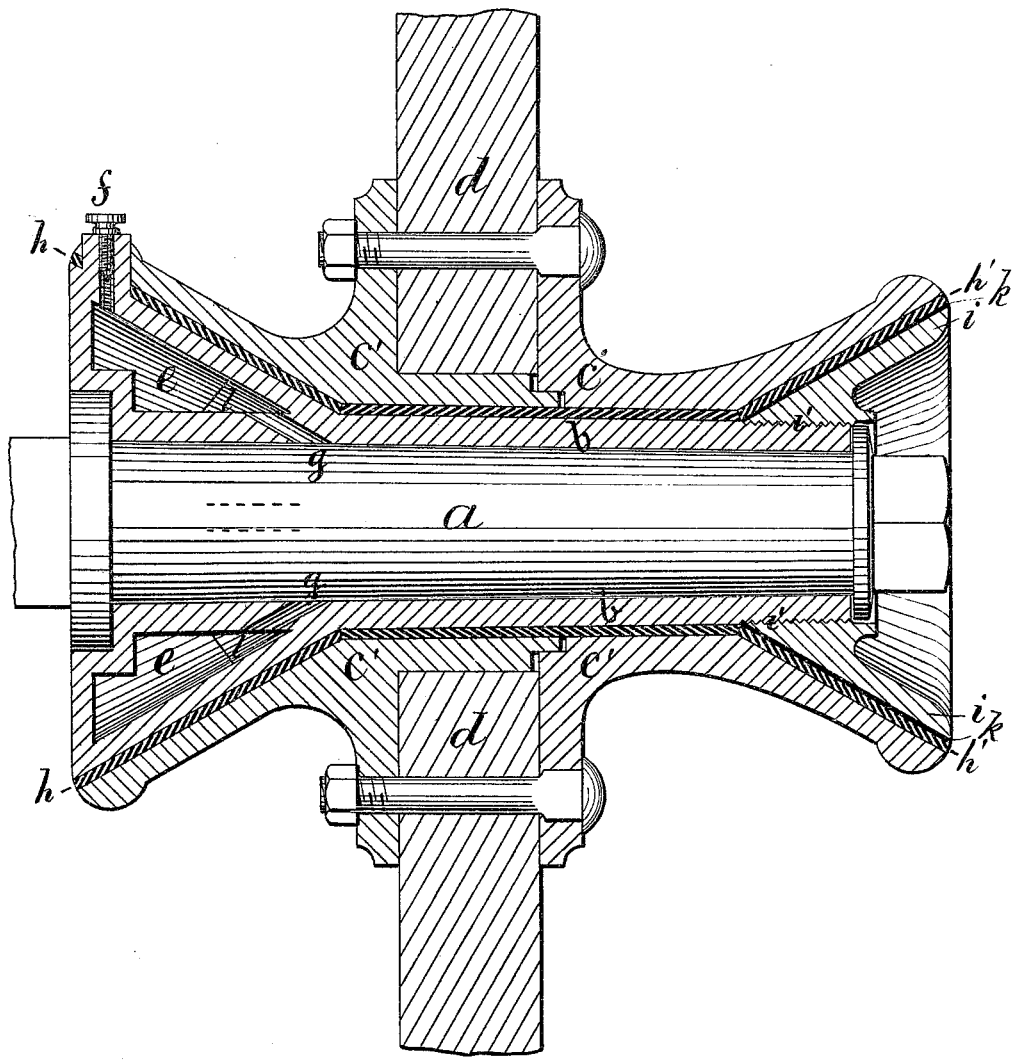

In the accompanying drawings, Figure 1 represents a central longitudinal section of a wooden hub provided with my improvement, and Fig. 2 represents a similar section of a metallic hub provided with my improvement. Fig. 3 represents a conical packing as cut out from a flat sheet.

Similar letters refer to similar parts wherever they occur on the different parts of the drawings.

$a$ is the shaft or axle, with its sleeve or bearing $b$. $c$ is the wooden hub in Fig. 1, and $c'\ c'$ is a metallic hub, constructed in the usual manner. $d\ d$ are the spokes. $e$ is the conical chamber for the lubricant. $f$ is the screw covering the exterior inlet-opening for the lubricating material. $g\ g$ are the perforations leading from the conical chamber $e$ to the shaft or axle $a$. $h$ is the cone-shaped elastic packing surrounding the conical chamber $e$. $i$ is the conical nut, having a central screw-threaded portion, $i'$, fitting around the screw-threaded end of the sleeve or bearing $b$. $h'$ is the cone-shaped elastic packing in the outer end of the conically-recessed hub. $k$ is a cone-shaped metallic plate interposed between the packing $h'$ and the nut $i$, in order that the latter may be tightened up without defacing or tearing the cone-shaped elastic packing $h'$.

If it is desired to lubricate the axle from both ends the nut $i$ may then be made as a hollow chamber, provided with inlet and outlet openings similar to the chamber $e$, screw $f$, and perforations $g\ g$. $l\ l$ are the feathered ribs at the junction of the chamber $e$ with the central sleeve $b$.

What I wish to secure by Letters Patent, and claim, is—

1. The combination, with a vehicle-wheel hub, of the sleeve $b$, extending throughout the said hub, and formed with the conical chambered end $e$ and screw-threaded end, the conical nut $i$, adapted to said screw-threaded end, and the conical elastic packings $h\,h'$, interposed between the conical chambered end of the sleeve and the conical nut, substantially as and for the purpose described.

2. The sleeve $b$ formed with the conical end, in combination with the vehicle-wheel hub, the conical elastic packing $h$, the conical nut $i$, and the conical metallic plate $k$, interposed between the nut and the hub, substantially as described.

3. The sleeve $b$, formed with a conical end, having a chamber, $e$, communicating with the axle to be lubricated, in combination with the vehicle-wheel hub, having a cone-shaped recess in its end, within which the conical end of the sleeve is arranged, and the cone-shaped elastic packing $h$ between the hub and said conical end of the sleeve, substantially as and for the purpose described.

In testimony that I claim the foregoing as my own invention I have affixed my signature in presence of two witnesses.

JACOB EDSON.

Witnesses:
ALBAN ANDRÉN,
HENRY CHADBOURN.